Patented Sept. 23, 1924.

1,509,729

UNITED STATES PATENT OFFICE.

THEODORE HOSTETTER, OF TOLEDO, OHIO, ASSIGNOR, BY MESNE ASSIGNMENTS, TO THE KRANTZ REALTY & INVESTMENT COMPANY, OF TOLEDO, OHIO, A CORPORATION OF OHIO.

METHOD OF FACING MOLDED ARTICLES.

No Drawing.   Application filed July 14, 1920.   Serial No. 396,101.

*To all whom it may concern:*

Be it known that I, THEODORE HOSTETTER, a citizen of the United States of America, residing at Toledo, Lucas County, Ohio, have invented a new and useful Method of Facing Molded Articles, of which the following is a specification.

This invention relates to the manufacture of compositions having durability as unit objects and assembled into structures.

This invention has utility when incorporated as artificial marble, stone, sheet material, vessels, etc., even for embodiment in coffins, refrigerators, vehicle bodies, as well as decorative articles, and tiles.

In the carrying out of this invention, a mold may be provided the complexity of a decorative form, or the simplicity of a slab. Into this mold is introduced a thin coating by pouring the liquid or semi-viscous material. This coating material is preferably of such thinness in consistency as to readily flow into the most minute crevices of the mold, but is sufficiently thick or heavy in its viscosity that in spreading such coating thereover it may retain or form a filmlike skin or coating over higher portions of the mold approximating in thickness the coating on the deeper portions. With this material in the physical state of a thin syrup, there is not such cohesion in its mass as to entrain air bubbles from the mold at the mold surface, and the coating is of a material to soon set as a shell.

This coating material may be satisfactorily formed with caustic burned magnesite as a hardener base, supplemented with magnesium chloride water solution to give fluidity to the plastic. To give toughness to this material as a finish coating for the completed article additional ingredients are included. With gypsum as an additional ingredient, it may serve as a pigment in making a gray, white, or light colored finish, say as the general background for artificial marble. This painted on or flowed in coating for a mold may show faults in resemblance to the natural stone. To have such appear, the coating may be streaked to clear the mold surface, and pigment mineral color coating painted, or flowed into such streaks, the mold shaken or vibrated to relieve the harshness of the marking lines of the tool, and these combined coatings, still thin as to measurement from the surface of the mold, allowed to set partially.

The proportions may be varied slightly, but for carrying out the invention, physical conditions must be given due weight. For a color coating there may be used one part by weight of caustic burned magnesite in a finely subdivided state, as a flour, two parts of mineral color, and then the magnesium chloride solution to the desired consistency. Instead of combining in the order of the proportions above given, the dry materials are thoroughly mixed and added to the liquid. When substituting gypsum for the mineral color, the gypsum may be used in approximately equal proportion with the magnesite.

When the finish coating is to be in solid color, but one finish coating is used. The finish coating may be of just sufficient body to conceal the filler effectively and in practice has varied from 1/64" to nearly 1/8". The principle involved is that the coating is dense and hard and should not be of such mass as to unequally set to introduce internal weaknesses, nor should it be of such mass that there is such superficial rigidity as to preclude cushioning action of the filler, for this latter hardness may tend to cause fracture, checks or cracks to appear.

While the coating is fresh, but partially set, the filler or body, as a plastic, is introduced as the base to complete or fill the mold. This filler, non-fluid or a thick dough in consistency when added, may approximate the setting rate of the coating, to the end that there may be a simultaneous setting for cohesion between the coating and filler. The complete shaping of the filler to conform to the mold may be assisted by slight pressure, but not such pressure as to cause coarse filler particles to rupture the coating. The setting rate may be accelerated by warming or heating.

As magnesite and magnesium chloride solution are used to give the hardening properties to the coating, such may be used to a somewhat less extent in giving hardening properties to the filler, which may have as its body wood or coal ashes, wood pulp, cinders, or other pulverized waste material. The pulp or less weight ingredients may contribute to a light weight or porous body, permitting the production of finished material of specific gravity as low as even light woods.

The great utility herein is that the molding or casting may produce the completed article without necessity for additional surface treatment. The article is painted before it is made, in this pre-coating method. The finish may be of the lustre of a high polish, or a dead matte, as the mold surface imparts. To this end the mold may be earthen and glaze coated, say with a varnish, or even a glass mold might be used.

Articles formed as described may be finished with the coating on but one side, say when in the form of angle decorations, say for coffin trimmings, wherein warping may not be detrimental. However, when the filler is porous, deleterious action may start from taking up moisture in such filler. This may be effectively eliminated as to warping by coating the opposite sides of the article with the paint coat as to the opposing mold walls. If one of the walls be concealed, the dense coat thereon need not be decorative. It is further desirable, when taking steps to resist all moisture attack, that the elements, if assembled in a structure be fully sealed. Elements having faces exposed may on assembly have magnesite, magnesium chloride and a toughener ingredient as a cement waterproof, on setting uniting them. As units, the elements may be sealed entirely by coating about the mold.

What is claimed and it is desired to secure by Letters Patent is:

1. The method of molding comprising flowing a coating about the mold interior, the coating flowing in such thinness that bubbles may not be trapped thereby to disturb the coating from conforming to the mold, and before the coating is set, pouring a filler body to carry thereupon such coating.

2. The method of molding comprising flowing a thin coating into a mold, allowing such coating to set partially, and backing such coating with a plastic filler body.

3. The method of molding comprising thinly coating the mold as a shallow viscous mass, allowing such mass to partially set as a shell, introducing a plastic filler against such shell for drying and pressed to form union therewith.

In witness whereof I affix my signature

THEODORE HOSTETTER.